Patented Feb. 9, 1926.

1,572,176

UNITED STATES PATENT OFFICE.

JEAN ALTWEGG AND EDOUARD FAU CHERMETTE, OF LYON, FRANCE, ASSIGNORS TO SOCIETE CHIMIQUE DES USINES DU RHONE, OF PARIS, FRANCE.

PROCESS FOR THE MANUFACTURE OF CONDENSATION PRODUCTS OF COMPOUND ALIPHATIC-AROMATIC KETONES WITH POLYALCOHOLS.

No Drawing.   Application filed March 19, 1924.   Serial No. 700,376.

*To all whom it may concern:*

Be it known that we, JEAN ALTWEGG, residing at Lyon, France, a citizen of the Confederation of Switzerland, and EDOUARD FAU CHERMETTE, residing at Lyon, France, a citizen of the Republic of France, have invented certain new and useful Improvements in the Process for the Manufacture of Condensation Products of Compound Aliphatic-Aromatic Ketones With Polyalcohols, of which the following is a specification.

It is known that acetone and glycerin, mixed in the presence of small quantities of hydrochloric acid combine in forming a condensation product currently known under the name acetone-glycerin.

In applying this mode of condensation to higher ketones, difficulties were met with, caused by the small solubility of these ketones in the poly-alcohols (see Emile Fischer, Ber. d. Deutsch Chem. Gesell., 1895, vol. 28, page 1168). The difficulties are still greater for the compound aliphatic-aromatic ketones, which are insoluble in the poly-alcohols.

We have found that these ketones can nevertheless be easily condensed with the poly-alcohols, and give condensation products analogous to acetone-glycerin. To obtain this condensation, it is necessary to perform the operation in the presence of a primary alcohol containing small quantities of mineral acids. The reaction takes place at ordinary temperature, but it gives particularly interesting results at temperatures near 0° C. or below 0° C. The duration of the reaction varies according to the conditions obtaining, from about one hour to two days. To isolate the condensation products, one may operate as for acetone glycerin, by neutralizing the mineral acid, but we have found that one obtains the same yields by mere fractionating of the reacting mass. It is preferable to operate upon a quantity of ketone greater than is necessary theoretically. This excess is easily recovered during the course of the operation itself. If the conditions are suitably selected, the formation of by-products is negligible. It is possible to cause not only pure poly-alcohols to enter in reaction, such as glycols, glycerin, erythrol (erythrite), mannite, but also derivatives of these poly-alcohols, such as for instance glycerin-chlorhydrin, glycerin esters, such as mono-acetin, and many other substances containing several hydroxyl groups, such as the poly-alcoholic acid esters, for instance ethyl tartrate and ethyl citrate.

The ketones which are susceptible of forming these condensation products are also very numerous. As examples may be mentioned acetophenone, propiophenone and their derivatives substituted in the benzene nucleus.

The condensation products obtained by the present process are colourless and are either solid or oily. They are soluble in most organic solvents, including sulphuric ether and benzene and its homologues, but not soluble in water. They may be distilled under reduced pressure without decomposition.

The uses to which these products may be put are very varied. They have sedative and slightly hypnotic properties which may be utilized in therapeutics. They are, besides, solvents for many organic substances. Incorporated, either alone or with any other adjuvants, in threads, films or plastic substances the basis of which is cellulose esters, they impart to these remarkably supple and elastic properties.

*Example 1.*

A mixture of 450 grammes of ethyl alcohol and 200 grammes of glycerine is cooled to $-10°$ C. and 5 grammes of sulphuric acid are added, then, gradually 500 grammes of acetophenone. The reacting mass is maintained 24 hours between $-5°$ C. and $-10°$ C., then is neutralized by the addition of anhydrous carbonate of sodium. The result is filtered and the alcohol is distilled off, and afterwards, preferably under reduced pressure, the excess of acetophenone. The condensation product, acetophenone-glycerin, remains as residue. It is freed from a little glycerin which contaminates it by washing it with water, and it is rectified, under reduced pressure, by 5 mm. of mercury, for instance. In this manner it distils at 134° C.

without decomposition. It is a viscous oil, the density of which at 15° C. is 1.159.

Incorporated in acetylated cellulose in the proportion of 20 per cent, for example, a substance is obtained which gives films of exceptional suppleness, elasticity and transparency, without any decrease of resistance.

*Example 2.*

The absorption of 50 grammes of gaseous hydrochloric acid by 5 kilogrammes of methyl alchohol is performed, and 5 kilogrammes of acetophenone and 2 kilogrammes of glycerin are added. This mixture is kept for 12 hours in an ice safe and then distilled. The methyl alcohol, the hydrochloric acid, and the water of formation is distilled off at normal pressure, then, under reduced pressure, the non-transformed acetophenone. Raw acetophenone-glycerin remains, and is purified as in Example 1.

*Example 3.*

By substituting in Example 2 propiophenone for acetophenone and allowing the mixture to stand for 40 hours at a temperature between $+5°$ and $+10°$ C., propiophenone-glycerin is obtained in a similar manner. It boils at 140° C. under the pressure of 5 mm. of mercury, and its density at 15° C. is 1.1255.

The properties of this condensation product are very similar to those of acetophenone-glycerin.

*Example 4.*

A mixture of 200 cc. methyl alcohol containing 5 grammes of gaseous hydrochloric acid, 500 grammes of acetophenone and 200 grammes of ethylene glycol is allowed to stand for 48 hours at ordinary temperature. The resulting product is distilled, so as to expel first at normal pressure the methyl alcohol, the water, and the hydrochloric acid, then, preferably under reduced pressure, the acetophenone in excess. Acetophenone-glycol remains as a crystalline mass, which is purified by recrystallization, in alcohol for example. Fine transparent needles are obtained, melting at 62° C. The acetophenone-glycol may be distilled under reduced pressure without decomposition. It boils at 130° C. under a pressure of 40 mm. and the distilled product crystallizes in colourless lamallæ melting also at 62° C.

*Example 5.*

250 grammes of methyl alcohol containing 1% hydrochloric acid are mixed with 500 grammes of acetophenone, 100 grammes of glycerin mono-chlorhydrin, and the mixture is allowed to stand for 48 hours at a temperature of from $+5°$ to 10° C. It is then rectified. The fraction 150°–155° under a pressure of 40 mm. is the acetophenone-monochlorhydrin which occurs under the form of a colourless, syrup-like liquid, distilling at from 153.0° to 153.3° under 40 mm. of pressure. Double normal hydrochloric acid splits it at 60° C. into acetophenone and monochlorhydrin.

What we claim and desire to secure by Letters Patent is:—

1. Process for the manufacture of condensation products of compound aliphatic-aromatic ketones with polyalcohols, by allowing compound ketones to react on polyalcohols in the presence of primary alcohols containing small quantities of mineral acids.

2. Process for the manufacture of condensation products of compound aliphatic-aromatic ketones with polyalcohols, by allowing compound ketones to react on polyalcohols at a low temperature in the presence of primary alcohols containing small quantities of mineral acids.

3. Process for the manufacture of acetophenone glycerin by allowing acetophenone and glycerin to react in the presence of alcohol and sulphuric acid.

4. Process for the manufacture of acetophenone glycerin by allowing acetophenone and glycerin to react at a low temperature in the presence of alcohol and sulphuric acid.

5. Process for the manufacture of acetophenone glycerin by cooling at $-10°$ C. a mixture of 450 grammes of ethyl alcohol and 200 grammes of glycerin, and adding first 5 grammes of sulphuric acid, then, gradually, 500 grammes of acetophenone, maintaining 24 hours at $-5°$ to $-10°$ C., neutralizing with anhydrous carbonate of sodium, filtering, distilling first the alcohol, then, under reduced pressure, the excess of acetophenone, and washing the residual acetophenone glycerin.

In testimony whereof, we affix our signatures.

JEAN ALTWEGG.
EDOUARD FAU CHERMETTE.